United States Patent Office 3,437,499
Patented Apr. 8, 1969

3,437,499
GLASS CONTACT REFRACTORY AND METHOD OF MAKING THE SAME
William Horak, West Hartford, and George Robert Rowland, Bloomfield, Conn., assignors to Emhart Corporation, Bloomfield, Conn., a corporation of Connecticut
No Drawing. Filed Mar. 4, 1966, Ser. No. 531,781
Int. Cl. C04b 35/66, 35/64, 35/48
U.S. Cl. 106—57         1 Claim

ABSTRACT OF THE DISCLOSURE

The making of a refractory body which is highly resistant to thermal shock and is highly resistant to corrosion by molten glass in a method which involves making a mixture of zircon, stabilized zirconia, alumina, fused mullite, clay, and calcined kyanite in water, molding the mixture to form the body and then sintering the body at a temperature below that at which the zircon decomposes.

---

This invention relates to the manufacture of refractory articles, and it is the general object of the invention to provide a high performance glass contact refractory (i.e., one which is dense, exhibits high resistance to thermal shock and to corrosion and which maintains a high strength level when subjected to contact by soda-lime glass or the like at the molten temperature of such glass), and to produce such refractory economically in a process involving molding and firing.

In keeping with the invention, the ceramic refractory provided is composed essentially, on the oxide basis, of zirconia ($ZrO_2$), alumina ($Al_2O_3$), and silica ($SiO_2$) containing finely crystalline mullite and zircon.

It is known that glass contact refractories containing primarily $ZrO_2$, $Al_2O_3$, and $SiO_2$ can be made by fusing batches which may comprise a zirconium mineral, such as zirkite (impure zirconia) or zircon ($ZrSiO_4$), and one or more minerals containing $Al_2O_3$ and $SiO_2$, such as clay, or diapore, or bauxite, or quartz. However, in such fused refractories, some of the $SiO_2$, instead of combining with the $Al_2O_3$ as mullite, forms a harmful glassy matrix. This matrix may contaminate molten glass leaving an open structure which accelerates penetration and reaction on the refractory. The other constituents of the fused refractory are present as zirconia ($ZrO_2$) and corundum ($Al_2O_3$).

It is also known that the zirconia-alumina-silica refractories can be made by sintering, rather than fusing, in the high temperature range of 1500° C. to 1800° C. In such sintering technique, the zircon can be made to react completely with alumina to form fine needle-like mullite crystals interspersed with zirconia. Within such temperature range, and more particularly at temperatures above 1538° C., the zircon ($ZrSiO_4$) decomposes as follows:

$$ZrSiO_4 \rightleftharpoons ZrO_2 + SiO_2$$

and the whole reaction proceeds according to the equation $$2ZrSiO_4 + 3Al_2O_3 = 2ZrO_2 + Al_6Si_2O_{13}$$

The reaction of the decomposed zircon and alumina is influenced by the intimacy of the mixture, the degree of comminution of the constituents, and the extent of sintering in the range of 1500° to 1800° C. A firing cycle of from 8 to 10 days may be required to develop the full reaction, but temperatures above 1810° C. are to be avoided because a siliceous glassy matrix can develop.

We have discovered that refractories composed of identical parts of zirconia ($ZrO_2$), alumina ($Al_2O_3$) and silica ($SiO_2$) on the oxide basis, but containing different crystal compositions of the zirconia constituent, vary widely in their resistance to thermal shock caused by sudden transient temperature changes. We have related this to the influence of the reversible coefficient of thermal expansion on the development of thermal stresses which may be of sufficient magnitude to cause failure (cracking) of the refractory.

Thermal expansion patterns for zirconia ($ZrO_2$) at and above the monoclinic-tetragonal transformation temperature of approximately 1000° C. are quite erratic, and this is due largely to the significant volume contraction of approximately 9% at transformation. After transformation, expansion will continue in an irregular manner. This may be due to cracks occurring during contraction. On the other hand, zircon ($ZrSiO_4$) has a uniformly low reversible thermal expansion coefficient up to the temperature of decomposition (1538° C.) and this enhances its resistance to thermal shock.

If zirconia-alumina-silica ($ZrO_2$-$Al_2O_3$-$SiO_2$) refractory bodies are batched from finely divided alumina and zircon in stoichiometric proportions and heated between 1500° C. (cone 16–17) and 1800° C. (cone 36) the resulting product will be composed essentially of an intimate, homogeneous, intercrystallized mixture of zirconia and mullite. If, instead of stoichiometric proportions, the batch contains an excess of alumina, the excess will be dispersed as corundum in the zirconia-mullite mixture. If these same batches are heated or fired in accordance with the present invention at a temperature less than 1538° C., and in the range of approximately 1400° C. to 1500° C., until equilibrium is approached, the zircon will be less prone to decompose and the zirconia ($ZrO_2$) will remain combined with the silica ($SiO_2$), precluding the presence of indigenous zirconia the reaction of the silica with alumina to form mullite.

In Table I there are shown the calculated batches for the specific stoichiometric proportions of zircon and alumina and examples of ranges of their proportions with other compatible refractory materials including stabilized zirconia, together with the corresponding compositions of their reaction products on the oxide basis and on the crystal basis depending upon whether the batches were fired above or below 1500° C.

TABLE I

| | Proportions by Weight | |
|---|---|---|
| | Stoichiometric | Examples |
| Batch: | | |
| Zircon | 54.5 | 7.5–39.0 |
| Zirconia | | 0.0–30.0 |
| Alumina | 45.5 | 11.5–92.5 |
| Fused Mullite | | 0.0–56.0 |
| Calcined Kyanite | | 0.0–81.0 |
| Product (Oxide Basis): | | |
| $ZrO_2$ | 36.5 | 5–50 |
| $Al_2O_3$ | 45.5 | 40–92.5 |
| $SiO_2$ | 18.0 | 2.5–35 |

| | Fired Above 1,500° C. | Fired Below 1,500° C. | Fired Above 1,500° C. |
|---|---|---|---|
| Product (Crystal Basis): | | | |
| Zircon | | 7.5–39.0 | 0.0–3.5 |
| Zirconia | 36.5 | 0.0–30.0 | 5.0–50.0 |
| Mullite | 63.5 | 0.0–83.0 | 0.0–83.0 |
| Corundum | | 0.0–57.0 | 0.0–92.5 |
| Silica plus Impurities | | 0.0–9.5 | 2.5–13.0 |

In order to compare thermal shock resistance, specimens were prepared of identical zirconia ($ZrO_2$), alumina ($Al_2O_3$), and silica ($SiO_2$) composition, but containing different crystal composition caused by firing above and below 1538° C., respectively. The refractory specimens thus prepared were inserted through apertures in a furnace door for part of their lengths and thus exposed to a stabilized furnace temperature of 2100° F. and 2300° F. in a matter of 10 seconds. The furnace temperature was again stabilized and the specimens held at the temperature for one-half hour. Then, the specimens were removed and allowed to cool approximately to room temperature, permitting bare handling. After each such cycle of heating, the specimens were examined visually for cracks, and their soundness was determined by "ringing" with a small mallet. A visual crack or loss of "ring" resulting in a dull sound in a specimen was cause for considering that it had failed. It was found that the specimens heated during their manufacture below the zircon dissociation temperature of 1538° C. had better resistance to sudden transient temperature changes as is shown herein in Table II.

TABLE II

| | Proportions by Weight | | |
|---|---|---|---|
| | Example A | B | C |
| Batch: | | | |
| Zircon | 17.4 | 30.0 | 34.8 |
| Alumina | 59.2 | 70.0 | 58.3 |
| Fused Mullite | 10.0 | | |
| Calcined Kyanite | 10.0 | | |
| Clay | 3.4 | | 6.9 |
| Product (Oxide): | | | |
| ZrO$_2$ | 11.4 | 19.8 | 22.8 |
| Al$_2$O$_3$ | 73.0 | 70.0 | 61.6 |
| SiO$_2$ | 15.6 | 10.2 | 15.6 |

| | Fired Above 1,500° C. | Fired Below 1,500° C. | Fired Above 1,500° C. | Fired Above 1,500° C. | Fired Below 1,500° C. |
|---|---|---|---|---|---|
| Product (Crystal) [X-Ray Diffraction]: | | | | | |
| Zircon | Trace | Strong | Strong | None | Strong |
| Zirconia | Strong | Trace | do | Strong | Trace |
| Mullite | do | Strong | do | do | Weak |
| Corundum | do | do | do | do | Strong |
| Thermal Shock Resistance (No. of cycles from Room Temp.) to: | | | | | |
| 2,100° F | 4, OK | 4, OK | 4, OK | | |
| 2,300° F | 1, Fail | 4, OK | 1, Fail | | |
| Corrosion (mm./hr.) | 0.0277 | 0.0241 | 0.0223 | | 0.0179 |

It will be observed in the foregoing table under column 1 that with refractory bodies batched from identical proportions or zircon and alumina with compatible refractory materials, those sintered below 1500° C. exhibited superior thermal shock resistance compared to those fired above 1500° C. Column 2 shows the thermal shock results of bodies batched from zircon and alumina without the compatible materials and fired above 1500° C., and it will be seen that the resistance to thermal shock was less than the resistance of specimens in column 1 fired below 1500° C.

Table II also plots the results of corrosion resistance testing of specimens batched as shown in columns 1 and 2 and a specimen in column 3 batched from zircon, alumina and clay and fired below 1500° C. The results indicate that corrosion resistance is not influenced appreciably by differences in crystal composition, and, therefore, refractory bodies sintered at temperatures below 1500° C. do not suffer a loss of corrosion resistance when compared to those sintered above that temperature.

The corrosion rate plotted in terms of mm. per hour was determined by making specimens 200 mm. long and 25 mm. by 25 mm. in cross section. The specimens were immersed through 85% of their length in molten soda-lime-silicate glass in a test furnace have the configuration of a miniature glass tank, heated at 1375° C. for 70 hours. The corrosion rate plotted was determined by noting the depth in mm. that the specimens were dissolved and dividing that depth by the number of hours.

Refractory bodies produced by the method of this invention may be molded or shaped in any well known manner, as for example by forming a slip of the finely divided batch materials in water. In a specific example, the batch materials comprise the following in proportions of weight in suitably graded particle sizes and distribution of sizes:

| | Percent |
|---|---|
| Zircon | 17.4 |
| Alumina | 59.2 |
| Fused Mullite | 10.0 |
| Calcined Kyanite | 10.0 |
| Clay | 3.4 |

The water content may be varied in accordance with the required rate of flow in the molding, and an electrolyte addition can be employed in accordance with known techniques.

The solid materials are added to the liquid during mixing, and, preferably, the finely divided ingredients are introduced before the coarser ingredients. The slip thus provided is cast in a suitable mold of plaster or the like and allowed to "set" for the time required by its shape to solidify. After solidification, the casting is removed from its mold and allowed to dry.

After thorough drying, the casting is fired or sintered by elevating the temperature slowly to between 1400° C. and 1500° C. The temperature is held for a period depending upon the shape and size of the body and its wall thickness, and the fired body is then permitted to cool slowly.

The invention claimed is:

1. The method of making a refractory body which is highly resistant to thermal shock and to corrosion by molten glass comprising making an intimate mixture consisting of substantially 17.4% by weight of zircon, 59.2% alumina, 10.0% fused mullite, 10.0% calcined kyanite and 3.4% clay, molding the mixture to form the body, and sintering the body at a temperature within the range of 1400° C. to 1500° C.

References Cited

UNITED STATES PATENTS

| 2,675,323 | 4/1954 | Busby et al. | 106—57 |
| 2,842,447 | 7/1958 | Schlotzhauer et al. | 106—57 |

FOREIGN PATENTS

| 947,441 | 1/1964 | Great Britain. |

JAMES E. POER, Primary Examiner.

U.S. Cl. X.R.

106—65, 67